Patented Aug. 18, 1936

2,051,744

UNITED STATES PATENT OFFICE 2,051,744

LUBRICATING COMPOSITION AND METHOD OF LUBRICATING AND IMPROVING THE LUBRICATING PROPERTIES OF OILS

Carl F. Prutton, East Cleveland, Ohio, assignor, by mesne assignments, to The Lubri-Zol Development Corporation, Cleveland, Ohio, a corporation of Delaware No Drawing. Application July 10, 1933, Serial No. 679,594

49 Claims. (Cl. 87—9)

This application is a continuation in part of my previously filed co-pending applications Ser. No. 463,366, filed June 23, 1930, and Ser. No. 638,599, filed October 19, 1932.

This application relates, as indicated, to a lubricating composition and a method of lubrication and/or method of improving the lubricating properties of lubricating oils and more particularly the invention relates to high pressure lubrication, i. e., lubrication of relatively moving metallic surfaces where the unit area pressure between such surfaces is in the neighborhood of or in excess of approximately 10,000 lbs. per square inch.

As has been explained by specialists in this particular field of the art, a lubricant employed for the purpose of reducing friction between relatively moving metallic surfaces may function in the two ways commonly referred to as "thick-film" lubrication and "thin-film" lubrication.

In "thick-film" lubrication the bearing surfaces are completely separated by a relatively thick continuous film of the lubricating composition employed. When friction between the moving parts is measured in this case, the results obtained are independent of all factors except pressure, speed and the viscosity of the lubricating composition employed. A single curve representing all data is found by plotting the coefficient of friction against a function consisting of the product of viscosity and speed divided by pressure per unit area, as long as the value of such function is greater than a definite amount. At this minimum point, reduction of viscosity or speed or increase in pressure results in a rupture of the film of lubricant. Although the value of the coefficient of friction is lowest at the point at which the film is about to fail, the increase in the coefficient of friction for higher viscosity and speed, or lower pressure, is relatively slight. The conditions resulting in "thick-film" lubrication are therefore those which result in low friction.

For pressures sufficiently great or for correspondingly low values of viscosity or speed, the film of lubricant, as above indicated, is ruptured, but although such film is ruptured, it is not entirely destroyed and the metallic bearing surfaces are still affected to some extent at least by the presence of the lubricant. This condition is commonly referred to as "thin-film" lubrication.

When one of the bearing surfaces is a bearing metal such as bronze or babbitt, seizure does not take place at once, but the coefficient of friction increases rapidly to abnormally high values with each slight further increase in pressure or decrease in viscosity or speed. For a given set of bearings, the data obtained for "thin-film" lubrication may be approximately co-ordinated into a single curve, but only on plotting coefficient of friction against the product of viscosity and speed divided by a power of the pressure lying between zero and one.

If both bearing surfaces are of steel, seizure or scoring will result almost immediately upon failure of "thick-film" lubrication when a pure mineral oil is the sole lubricating composition employed.

It is among the objects of my invention to provide a lubricating composition and a method of improving the lubricating properties of a lubricating oil, such as pure mineral oil, particularly to increase the breakdown pressure of the film of such oil between bearing surfaces and consequently to improve the thin film lubricating characteristics of the oil.

It is a further object of my invention to improve the lubricating properties of lubricating oils and to provide a method of lubricating relatively moving metallic surfaces by such means as will function in a fashion different from the accepted manner in which lubricating oils have been relied upon to reduce the friction between moving metallic parts. This invention contemplates the employment of an additional means assisting the lubricating oil in maintaining the proper separating film between the relatively moving surfaces. This invention contemplates the employment of certain halogen bearing materials which will react chemically with the relatively moving metallic surfaces, particularly under the conditions imposed by such relative movement, to create a film between such surfaces, which film is distinct from the film of pure lubricating oil which has been relied upon in the past to prevent the bearing surfaces from scoring even under such extreme pressure conditions as result in "thin-film" lubrication, as above pointed out.

I am aware of the fact that the addition of halogen bearing ingredients to a lubricating oil is broadly not new. In order that the present invention may be more clearly understood, brief reference will be had to the principal prior art patents pointing out what is believed to have been their contribution to the art so that the field to which the present invention relates may be more readily understood.

J. W. Aylsworth in his Patent No. 1,029,254 suggested the use of "a lubricating agent which has the physical property of being non-inflammable or difficultly inflammable imparted to it, whereby the danger from fire in situations in which such lubricant is used is greatly minimized" (page 1, lines 9 to 14). Aylsworth suggested for use as lubricants certain halogen substitution products of carbocyclic compounds, and further suggested the combination with such compounds of a quantity of different grades of machinery oils, but the minimum amount of such carbocyclic compounds which Aylsworth suggested would be necessary in order to render his composition non-inflammable, and to thereby achieve the purposes of his invention, is at least 30 per cent of the total composition. Aylsworth was successful in producing a lubricating composition which is substantially non-inflammable and he therefore taught a particular manner in which this end might be achieved.

Certain other patents have been granted to Aylsworth, but they all center around the problem of rendering a lubricating composition relatively non-inflammable so that it may be employed in the presence of open flame and similar regions of high temperature without burning.

The principle taught by Aylsworth, i. e., the use of certain halogen compounds for the purpose of providing a non-inflammable lubricant or one capable of withstanding high temperatures, has been followed in the development of the art since his invention, as for example U. S. Patent No. 1,668,022 to Midgley.

I am also aware of the fact that it has been suggested in the prior art (U. S. Patent No. 1,796,857 to Barnard) to add small proportional amounts of materials such as carbon tetrachloride to a lubricating oil, but for the purpose of reducing the viscosity of the oil to such an extent as to facilitate the starting or turning over of internal combustion engines at relatively low temperatures; the carbon tetrachloride or similar compound when the engine became heated being volatilized and leaving only the pure mineral oil with the higher viscosity necessary for continuous operating temperatures.

The additions to lubricating oils which I now propose and by which the objects of this invention may be attained have also been used to a certain extent as additions to electrical insulating oils particularly adapted for use in transformers where it was sought to render such oils non-inflammable, or for use in circuit breakers, etc., to reduce the amount of gas generated by arcing.

It is the principal object of my invention, therefore, to provide a method of lubricating and a method of improving the lubricating properties of lubricating oils by adding thereto relatively small amounts of certain halogen bearing ingredients which are active under the conditions imposed by relative movement between the bearing surfaces to chemically act upon such surfaces to produce a secondary film, as previously explained, but using such additions in percentages much lower than suggested in the prior art, as exemplified by the teachings of Aylsworth, in order to secure the desired improvement in the "thin-film" lubricating properties of the oil without such a reduction in the viscosity of the composition which would detract from its "thick-film" lubricating properties. It is also essential that the additions have a relatively high boiling point i. e., low vapor pressure so as not to be driven off during use at elevated temperature.

While the exact nature of the reaction between the halogen compounds and the metallic bearing surfaces is not fully understood, it is believed that the same is clearly a chemical action as indicated by an examination of the bearing surfaces. However, since this action is of the surface-reaction type it may perhaps be more accurately defined as a physico-chemical reaction.

Other objects of my invention will appear as the description proceeds.

To the accomplishment of the foregoing and related ends, said invention, then, consists of the steps hereinafter fully described and particularly pointed out in the claims, the following description setting forth in detail one approved method of carrying out the invention, such disclosed method, however, constituting but one of the various ways in which the principle of the invention may be used.

My invention, as above explained, contemplates the addition to a suitable oil base of minor proportions of halogenated compounds in such proportions as not to materially reduce the viscosity of the oil. Since the loss of such additions by volatilization will, in general, be less for higher boiling materials, the boiling point or temperature at which the vapor pressure reaches atmospheric pressure should be above 140° C.

The base of the lubricating composition is some oily material, such as mineral oil. There are three factors which determine the type of the halogenated carbon compounds which may be employed, viz., stability, boiling point, and effect on the viscosity of the resultant composition.

The halogenated compounds used are preferably of such a nature as to be sufficiently stable, or to resist hydrolysis in the presence of moisture, so that they will not cause corrosion of the bearings and other metallic parts exposed to the lubricant; that is, they will not chemically react to any substantial extent with such metallic parts excepting under conditions of extreme pressure and the like as above indicated. These requirements, in general, are met more specifically by halogenated carbon ring compounds as distinguished from open chain compounds. The chlorinated species of these carbon compounds is preferred, particularly due to their low cost and superiority of performance. As above indicated, the halogenated carbon ring compounds added to the oil base are preferably of the chlorinated species and particularly the following compounds have been found to produce very satisfactory results, viz., halogenated, or more specifically, chlorinated benzene compounds, such as, di-chlorbenzene, notably the ortho compound; chlorinated naphthalene; chlorinated diphenyl; halogenated, or more specifically, chlorinated homologs of the above such as toluene, methyl naphthalene, and phenyl toluene; chlorinated derivatives of benzene, naphthalene and diphenyl, such as aniline, naphthyl amine and phenyl aniline.

Of the chain compounds which may be employed, such as acetylene tetrachloride, butylene dichloride (1-2 di-chlor-butane), monochlorhexane, 1-2 dichlor hexane, (specifically, those having a vapor pressure less than atmospheric at a temperature of 140°) etc. or any other halogen substitution or addition products of the paraffins, olefines or acetylenes or derivatives of them, the less volatile and more stable are preferred for the reasons above set forth.

It is to be noted that the above enumerated examples of halogenated organic compounds useful as extreme pressure addition agents in accordance with this invention are compounds of the type which may be produced by direct halogenation, or by means of a suitable re-agent. These products, however, do not contain relatively unstable compounds of other inorganic elements introduced by such re-agent and are thus distinguished from such relatively unstable products as those prepared by treatment with reagents such as sulphur chloride and from which products the sulphur-bearing or other unstable constituents have not been removed.

As particularly pointed out herein, the addition agents used, in order that they may not be volatilized during use under high temperatures, should have a vapor pressure less than atmospheric at a temperature of 140° C. It will also be noted that numerous specific examples given, such as orthodichlorbenzene, the chlorinated naphthalenes and diphenyls, as well as their derivatives, all have a vapor pressure less than atmospheric at 170° C.

In addition, all of the specifically named compounds and groups of compounds suitable as addition agents to lubricating compositions according to the present invention are substantially stable, non-corrosive, and miscible or soluble in mineral oil, at least to the extent necessary to produce lubricants of the type herein contemplated.

By the term "oil-soluble" as used herein and in the claims is meant that property of the examples of addition agents disclosed herein which enables the same to be included, at least within the range of quantities herein contemplated, in a lubricating oil base such as mineral oil to produce a substantially permanently homogeneous lubricating composition.

It will be noted that certain of the specifically mentioned compounds such as acetylene tetrachloride, butylene dichloride, etc., contain considerably more than 50% halogen. Compounds of this character, i. e., compounds which contain more than 50% halogen are useful as extreme pressure addition agents to lubricating compositions since they enable the use of small amounts of base compounds which may be relatively expensive as carriers for substantial amounts of the halogen which is relied upon to impart the extreme pressure characteristics to the final composition.

Since the addition of compounds of the class including the above enumerated will usually reduce the viscosity of the oil base to which the same are added, if a large percentage of such compounds are added, there will be a tendency to destroy "thick-film" lubrication because of the reduction in viscosity of the composition. If an excessive quantity of such compounds are added, all of the lubrication will then be of the "thin-film" type and therefore produce a decided increase in the total amount of friction developed.

Optimum results are attained by using minimum quantities of these halogenated compounds so that their beneficial effect will not be overshadowed by their detrimental effect in reducing the viscosity of the composition. For ordinary uses or normal lubrication, the resultant composition will have inferior lubricating properties if the loss of viscosity is too great, such as would result from the use of more than 20% of halogenated compounds of any type.

My invention, therefore, contemplates adding to a suitable oil base halogenated carbon compounds having a boiling point over 140 degrees C. and in proportions from .10% to 20% of the total composition.

The optimum amount of the halogenated compound to be employed will depend upon the chemical activity of the particular compound as well as its physical characteristics including its effect on the viscosity of the oil to which it is added and the particular use for which the lubricant is intended. The reason that the chemical activity of the compound added determines the character and amount of such addition which should be used with the oil is due to the fact that a sufficient amount of the proper type must be present in order to react chemically under operating conditions with the bearing surfaces under operating conditions only to produce the so-called secondary film. The upper limit of the amount of addition agent employed is, as previously explained, determined by the effect of the addition upon the viscosity of the oil.

Extremely active compounds may be effective to accomplish the purposes of this invention when present in amounts even less than the above referred to minimum amount of 0.10%.

The presence of this secondary film can readily be determined by suitable test of metallic bearings operating with a lubricant of the above defined character and then scraping off the film which has been formed on the bearing surfaces and which upon chemical analysis will show the presence of the halogen in inorganic form.

For the purpose of lubricating and reducing the friction between the relatively moving parts of an internal combustion engine, such as crank case bearings, piston and cylinder surfaces, as well as piston rings and valves, my invention contemplates adding to a suitable oil base, such as mineral oil, concentrations of from .10% to 2% of halogenated compounds containing from 50 to 25% of chlorine. If the valve structure of the engine is to be lubricated separately from the remainder of the mechanism or by means acting in an auxiliary fashion, the lubricating composition between the moving surfaces will preferably contain a larger amount of such halogenated compounds, i. e., from 1% to 10%.

The invention described herein has a particular advantage in the tendency of the compounded lubricant employed to keep down the carbon formation and hence this method is particularly applicable for improving the lubricating properties of a lubricating oil employed as the lubricant for the upper parts, i. e., pistons, valves, pistons rings, etc., of an internal combustion engine by dissolving the specified composition in the motor fuel so that such fuel when introduced in to the combustion chamber is volatilized and the lubricating composition distributed over the walls of such chamber as well as the valves and their associated parts.

My invention has certain definite advantages, of which the following may be mentioned:

First: By this invention it is possible to extend the pressure range because of the reduced tendency for bearing surfaces to become scored or to seize at higher pressures than are allowable with ordinary lubricants.

Second: The friction is reduced, especially in the higher pressure range below that obtained with ordinary lubricants.

The subject-matter of this application is related to the subject-matter of my co-pending application Ser. No. 635,701, filed September 30, 1932.

Other modes of applying the principle of my invention may be employed instead of the one explained, change being made as regards the method herein disclosed, provided the step or steps stated by any of the following claims or the equivalent of such stated step or steps be employed.

I, therefore, particularly point out and distinctly claim as my invention:

1. As a composition of matter, a lubricating composition having as a principal lubricating constituent the combination of mineral oil and from about one-tenth per cent. to twenty per cent., based on the amount of such mineral oil, of a halogenated organic compound having a boiling point over 140° C.

2. As a composition of matter, a lubricating composition having as a principal lubricating constituent the combination of mineral oil and from about one-tenth per cent. to twenty per cent., based on the amount of such mineral oil, of a chlorinated organic compound having a boiling point over 140° C.

3. As a composition of matter, a lubricating composition having as a principal lubricating constituent the combination of mineral oil and from about one-tenth per cent. to twenty per cent., based on the amount of such mineral oil, of a chlorinated organic compound having a boiling point over 170° C.

4. As a composition of matter, a lubricating composition having as a principal lubricating constituent the combination of mineral oil and from about one-tenth per cent. to twenty per cent., based on the amount of such mineral oil, of a stable, oil-soluble, halogenated organic compound having a vapor pressure less than atmospheric at 140° C.

5. As a composition of matter, a lubricating composition having as a principal lubricating constituent the combination of mineral oil and from about one-tenth per cent. to twenty per cent., based on the amount of such mineral oil, of a stable, oil-soluble, chlorinated organic compound having a vapor pressure less than atmospheric at 140° C.

6. As a composition of matter, a lubricating composition having as a principal lubricating constituent the combination of mineral oil and from about one-tenth per cent. to two per cent., based on the amount of such mineral oil, of an oil-soluble, halogenated organic compound having a vapor pressure less than atmospheric at 140° C.

7. As a composition of matter, a lubricating composition having as a principal lubricating constituent the combination of mineral oil and from about one-tenth per cent. to two per cent., based on the amount of such mineral oil, of an oil-soluble, chlorinated organic compound having a vapor pressure less than atmospheric at 140° C.

8. As a composition of matter, a lubricating composition having as a principal lubricating constituent the combination of mineral oil and from about one-tenth per cent. to two per cent., based on the amount of such mineral oil, of an oil-soluble, chlorinated organic compound having a vapor pressure less than atmospheric at 170° C.

9. As a composition of matter, a lubricating composition having as a principal lubricating constituent the combination of mineral oil and from a minimum effective amount to about two per cent., based on the amount of such mineral oil, of a stable, oil-soluble, halogenated organic compound having a vapor pressure less than atmospheric at 140° C., and containing from about twenty-five per cent. to about fifty per cent. halogen.

10. As a composition of matter, a lubricating composition having as a principal lubricating constituent the combination of mineral oil and from a minimum effective amount to about two per cent., based on the amount of such mineral oil, of an oil-soluble, chlorinated organic compound having a vapor pressure less than atmospheric at 140° C., and containing from about twenty-five per cent. to about fifty per cent. chlorine.

11. As a composition of matter, a lubricating composition having as a principal lubricating constituent the combination of mineral oil and from about one per cent. to ten per cent., based on the amount of such mineral oil, of an oil-soluble, halogenated organic compound having a vapor pressure less than atmospheric at 140° C.

12. As a composition of matter, a lubricating composition having as a principal lubricating constituent the combination of mineral oil and from about one per cent. to ten per cent., based on the amount of such mineral oil, of an oil-soluble, chlorinated organic compound having a vapor pressure less than atmospheric at 140° C.

13. As a composition of matter, a lubricating composition having as a principal lubricating constituent the combination of mineral oil and from about one per cent. to ten per cent., based on the amount of such mineral oil, of an oil-soluble, chlorinated organic compound having a vapor pressure less than atmospheric at 170° C.

14. As a composition of matter, a lubricating composition having as a principal lubricating constituent the combination of mineral oil from about one-tenth per cent. to twenty per cent., based on the amount of such mineral oil, of an oil-soluble, halogenated organic compound having a vapor pressure less than atmospheric at 140° C., and containing from about twenty-five per cent. to about fifty per cent. halogen.

15. As a composition of matter, a lubricating composition having as a principal lubricating constituent the combination of mineral oil and from about one-tenth per cent. to twenty per cent., based on the amount of such mineral oil, of a stable, oil-soluble, chlorinated organic compound having a vapor pressure less than atmospheric at 170° C., and containing from about twenty-five per cent., to about fifty per cent. chlorine.

16. A lubricating composition having as a principal lubricating constituent, the combination of mineral lubricating oil and a halogenated organic compound, said compound having a vapor pressure less than atmospheric at a temperature of 140° C. and present in an amount less than twenty per cent., based on the amount of mineral oil, but sufficient to provide a lubricating composition effective to prevent seizure and scoring of relatively moving metallic surfaces under pressures substantially in excess of 10,000 pounds per square inch.

17. A lubricating composition having as a principal lubricating constituent, the combination of mineral lubricating oil and a stable, oil-soluble, chlorinated organic compound, said compound having more than twenty-five per cent. chlorine and a vapor pressure less than atmospheric at a temperature of 170° C. and present in an amount less than ten per cent., based on the amount of mineral oil, but sufficient to provide a lubricating composition effective to prevent seizure and scoring of relatively moving metallic surfaces under pressures substantially in excess of 10,000 pounds per square inch.

18. As a composition of matter, a lubricating composition having as a principal lubricating constituent the combination of mineral oil and from about one-tenth per cent. to twenty per cent., based on the amount of such mineral oil, of a stable, oil-soluble, halogenated hydrocarbon having a vapor pressure less than atmospheric at 140° C.

19. As a composition of matter, a lubricating composition having as a principal lubricating constituent the combination of mineral oil and from from one-tenth per cent. to twenty per cent., based on the amount of such mineral oil, of a stable oil-soluble, chlorinated hydrocarbon having a vapor pressure less than atmospheric at 140° C.

20. As a composition of matter, a lubricating composition having as a principal lubricating constituent the combination of mineral oil and from about one-tenth per cent. to two per cent., based on the amount of such mineral oil, of a stable, oil-soluble, halogenated hydrocarbon having a vapor pressure less than atmospheric at 140° C.

21. As a composition of matter, a lubricating composition having as a principal lubricating constituent the combination of mineral oil and a minor proportion, based on the amount of such mineral oil, of a halogenated open-chain organic compound having a boiling point over 140° C.

22. As a composition of matter, a lubricating composition having as a principal lubricating constituent the combination of mineral oil and a minor proportion, based on the amount of such mineral oil, of a chlorinated open-chain organic compound having a boiling point over 140° C.

23. As a composition of matter, a lubricating composition having as a principal lubricating constituent the combination of mineral oil and a minor proportion, based on the amount of such mineral oil, of a chlorinated open-chain organic compound having a boiling point over 170° C.

24. As a composition of matter, a lubricating composition having as a principal lubricating constituent the combination of mineral oil and from about one-tenth per cent. to twenty per cent., based on the amount of such mineral oil, of a stable, oil-soluble, halogenated open-chain organic compound having a vapor pressure less than atmospheric at 140° C.

25. As a composition of matter, a lubricating composition having as a principal lubricating constituent the combination of mineral oil and from about one-tenth per cent. to twenty per cent., based on the amount of such mineral oil, of a stable, oil-soluble, chlorinated open-chain organic compound having a vapor pressure less than atmospheric at 140° C.

26. As a composition of matter, a lubricating composition having as a principal lubricating constituent the combination of mineral oil and from about one-tenth per cent. to twenty per cent., based on the amount of such mineral oil, of a stable, oil-soluble, halogenated open-chain organic compound having a vapor pressure less than atmospheric at 140° C., and containing from about twenty-five per cent. to about fifty per cent. halogen.

27. As a composition of matter, a lubricating composition having as a principal lubricating constituent the combination of mineral oil and from about one-tenth per cent. to twenty per cent., based on the amount of such mineral oil, of a stable, oil-soluble, chlorinated open-chain organic compound, having a vapor pressure less than atmospheric at 140° C., and containing from about twenty-five per cent. to about fifty per cent. chlorine.

28. As a composition of matter, a lubricating composition having as a principal lubricating constituent the combination of mineral oil and from about one-tenth per cent. to twenty per cent., based on the amount of such mineral oil, of a stable, oil-soluble, chlorinated open-chain organic compound, having a vapor pressure less than atmospheric at 170° C., and containing from about twenty-five per cent. to about fifty per cent. chlorine.

29. As a composition of matter, a lubricating composition having as a principal lubricating constituent the combination of mineral oil and from about one-tenth per cent. to two per cent., based on the amount of such mineral oil, of a stable, oil-soluble, halogenated open-chain organic compound having a vapor pressure less than atmospheric at 140° C.

30. As a composition of matter, a lubricating composition having as a principal lubricating constituent the combination of mineral oil and from about one-tenth per cent. to two per cent., based on the amount of such mineral oil, of a stable, oil-soluble, chlorinated open-chain compound having a vapor pressure less than atmospheric at 140° C.

31. As a composition of matter, a lubricating composition having as a principal lubricating constituent the combination of mineral oil and from about one-tenth per cent. to two per cent., based on the amount of such mineral oil, of a stable, oil-soluble, chlorinated open-chain organic compound having a vapor pressure less than atmospheric at 170° C.

32. As a composition of matter, a lubricating composition having as a principal lubricating constituent the combination of mineral oil and from about one per cent. to ten per cent., based on the amount of such mineral oil, of a stable, oil-soluble, halogenated open-chain organic compound having a vapor pressure less than atmospheric at 140° C.

33. As a composition of matter, a lubricating composition having as a principal lubricating constituent the combination of mineral oil and a minor proportion, based on the amount of such mineral oil, of at least one compound of the class consisting of halogen substitution and addition products of the paraffins, olefines, acetylenes, and derivatives of such hydrocarbons, such halogen compounds having boiling points over 140° C.

34. As a composition of matter, a lubricating composition having as a principal lubricating constituent the combination of mineral oil and a minor proportion, based on the amount of such mineral oil, of at least one compound of the class consisting of chlorine substitution and addition products of the paraffins, olefines, acetylenes, and derivatives of such hydrocarbons, such chlorine compounds having boiling points over 140° C.

35. As a composition of matter, a lubricating composition having as a principal lubricating constituent the combination of mineral oil and from about one-tenth per cent. to twenty per cent., based on the amount of such mineral oil, of at least one stable, oil-soluble, compound of the class consisting of halogen substitution and addition products of the paraffins, olefines, acetylenes, and derivatives of such hydrocarbons, such halogen compounds having vapor pressures less than atmospheric at 140° C.

36. As a composition of matter, a lubricating composition having as a principal lubricating constituent the combination of mineral oil and from about one-tenth per cent. to twenty per cent., based on the amount of such mineral oil, of at least one stable, oil-soluble, compound of the class consisting of chlorine substitution and addition products of the paraffins, olefines, acetylenes, and derivatives of such hydrocarbons, such chlorine compounds having vapor pressures less than atmospheric at 140° C.

37. As a composition of matter, a lubricating composition having as a principal lubricating constituent the combination of mineral oil and from about one-tenth per cent. to two per cent., based on the amount of such mineral oil, of at least one stable, oil-soluble, compound of the class consisting of halogen substitution and addition products of the paraffins, olefines, acetylenes, and derivatives of such hydrocarbons, such halogen compounds having a vapor pressure less than atmospheric at 140° C.

38. As a composition of matter, a lubricating composition having as a principal lubricating constituent the combination of mineral oil and from about one-tenth per cent. to two per cent., based on the amount of such mineral oil, of at least one stable, oil-soluble compound of the class consisting of chlorine substitution and addition products of the paraffins, olefines, acetylenes, and derivatives of such hydrocarbons, such chlorine compounds having vapor pressures less than atmospheric at 140° C.

39. As a composition of matter, a lubricating composition having as a principal lubricating constituent the combination of mineral oil and from about one per cent. to ten per cent., based on the amount of such mineral oil, of at least one stable, oil-soluble compound of the class consisting of halogen substitution and addition products of the paraffins, olefines, acetylenes, and derivatives of such hydrocarbons, such halogen compounds having vapor pressures less than atmospheric at 140° C.

40. As a composition of matter, a lubricating composition having as a primary lubricating constituent the combination of mineral oil and a minor proportion based on the amount of such mineral oil of at least one compound of the class consisting of acetylene tetrachloride, butylene dichloride, monochlorhexane, and dichlorhexane.

41. As a composition of matter, a lubricating composition having as a principal lubricating constituent the combination of mineral oil and a minor proportion, based on the amount of such mineral oil, of chlorinated hexane.

42. As a composition of matter, a lubricating composition having as a principal lubricating constituent the combination of mineral oil and a total of about one-tenth per cent. to less than twenty per cent., based on the amount of such mineral oil, of halogenated organic compounds having vapor pressures less than atmospheric at 140° C.

43. As a composition of matter, a lubricating composition having as a principal lubricating constituent the combination of mineral oil and from one-tenth per cent. to twenty per cent., based on the amount of such mineral oil, of a halogenated organic compound having a vapor pressure of less than atmospheric at 140° C. and containing more than fifty per cent halogen.

44. The method of reducing friction between relatively moving metallic surfaces which comprises maintaining therebetween a film of lubricating oil and at the same time chemically acting upon said surfaces by means of a halogenated organic constituent in said oil film having a vapor pressure less than atmospheric at 140° C. and present in said oil film in quantities less than about twenty per cent.

45. The method of reducing friction between relatively moving metallic surfaces which comprises maintaining therebetween a film of lubricating oil and at the same time chemically acting upon said surfaces by means of a halogenated hydrocarbon constituent in said oil film having a vapor pressure less than atmospheric at 140° C. and present in said oil film in quantities less than about twenty per cent.

46. The method of reducing friction between relatively moving metallic surfaces which comprises maintaining therebetween a film of lubricating oil and at the same time chemically acting upon said surfaces by means of a halogenated organic constituent in said oil film having a vapor pressure less than atmospheric at 140° C. containing more than twenty-five per cent. halogen and present in said oil film in quantities less than about twenty per cent.

47. The method of reducing friction between relatively moving metallic surfaces which comprises maintaining therebetween a film of lubricating oil and at the same time chemically acting upon said surfaces by means of a halogenated organic constituent in said oil film having a vapor pressure less than atmospheric at 140° C. containing more than twenty-five per cent. halogen and present in said oil film in quantities less than about ten per cent.

48. The method of reducing friction between relatively moving metallic surfaces which comprises maintaining therebetween a film of lubricating oil and at the same time chemically acting upon said surfaces by means of a halogenated open-chain organic constituent in said oil film having a vapor pressure less than atmospheric at 140° C. and present in said oil film in quantities less than about twenty per cent.

49. The method of lubricating relatively moving metallic surfaces which comprises maintaining therebetween a film of lubricating oil and at the same time chemically acting upon such surfaces by means of a stable, oil-soluble, chlorinated organic constituent in said oil film, said constituent containing more than twenty-five per cent. chlorine, having a vapor pressure less than atmospheric at 170° C. and present in said oil film in quantities less than about ten per cent.

CARL F. PRUTTON.